Nov. 9, 1965    E. C. GOFF    3,216,124
THREAD GAUGE
Filed June 21, 1963
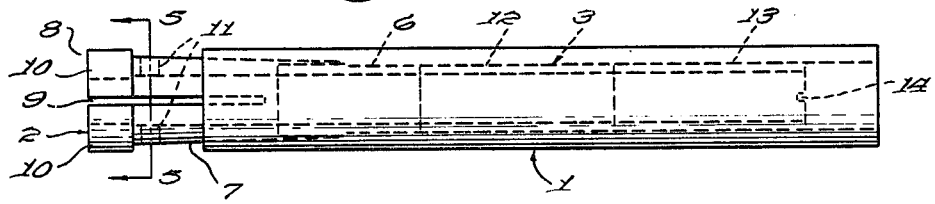
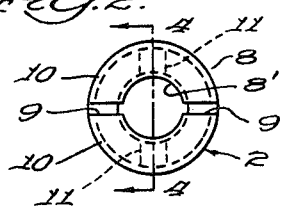 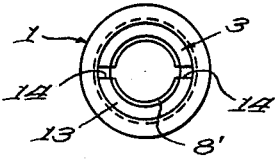 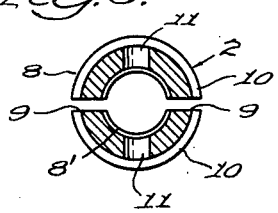
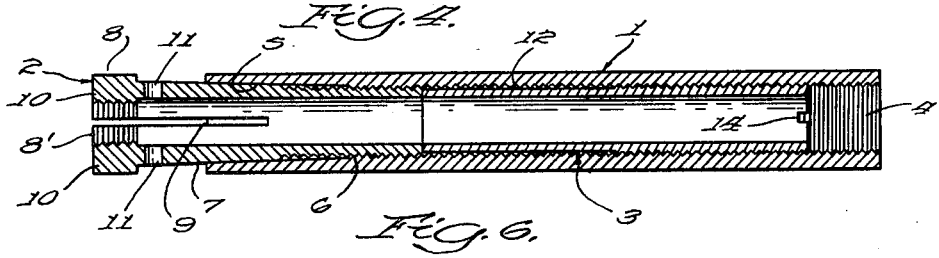
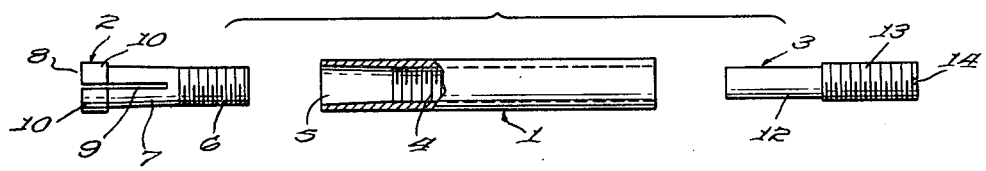
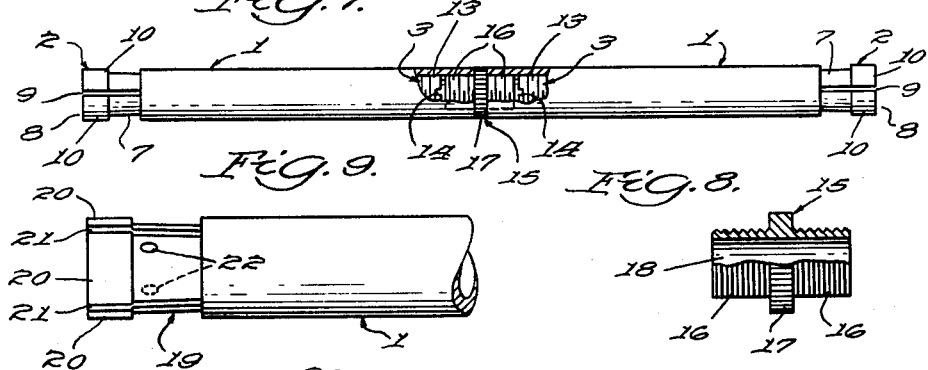
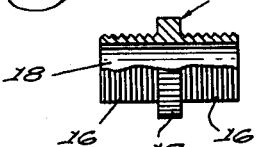
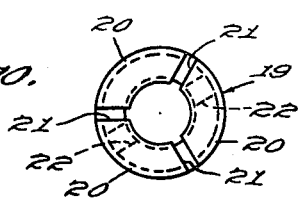
Inventor:
Edward C. Goff.
By Harold J. LeVescontl
Atty United States Patent Office 3,216,124
Patented Nov. 9, 1965

3,216,124
THREAD GAUGE
Edward C. Goff, Glendale, Calif., assignor to Ponam Ltd., Inc., Glendale, Calif., a corporation of California
Filed June 21, 1963, Ser. No. 289,579
6 Claims. (Cl. 33—199)

This invention relates to thread gauges and more particularly to an improved form thereof for gauging external threads.

An object of the invention is to provide a ring type gauge for external threads which is particularly adapted for use in locations affording limited clearance. Another object of the invention is to provide an external thread gauge disposed at the end of a long coaxially disposed handle means which handle means affords capacity both for very fine adjustment of the gauging component and the capacity for the ready cleaning of the gauge surfaces.

A further object of the invention is to provide a gauge for external threads having adjusting means and mounting means and in which a portion of the locking means is additionally usable as a connecting means for combining a "go" and "no go" gauge components in a single unit and which connecting means accommodates the cleaning of both gauges in a single operation.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of the thread gauge embodying the invention,

FIGS. 2 and 3 are end elevational views of the left hand and right ends respectively, of the gauge shown in FIG. 1, FIG. 4 is a longitudinal medial sectional view taken on the line 4—4 of FIG. 2, FIG. 5 is a transverse sectional view taken on the line 5—5 of FIG. 1, FIG. 6 is a reduced scale, exploded view of the component parts of the embodiment of the invention shown in the preceding figures, FIG. 7 is a reduced scale, side elevational view with a portion broken away showing two gauges united to form a single gauging unit, FIG. 8 is a side elevational view, partly in section, of the connecting means employed in the embodiment shown in FIG. 7, FIG. 9 is a fragmentary side elevational view with a modification of the gauge in which the gauging element is formed with three jaw elements instead of the two jaw elements shown in the preceding figures, and FIG. 10 is an end elevational view of the left hand end of the embodiment shown in FIG. 9.

Referring to the drawings the illustrated embodiment of the invention shown in FIGS. 1 through 6 comprises a handle component 1, a gauge component 2 and a locking component 3. The handle component comprises a tubular length of steel or other metal of suitable hardness and which for the major portion of its length is internally threaded; said threaded portion adjacent to one end thereof merging into the smaller end of a concentric, frusto-conical or tapered surface portion 5 and said smaller end preferably having a diameter of approximately the root diameter of the threaded portion and the taper therefrom being very slight, preferably a taper known as Brown & Sharpe #1 or a substantially equivalent included angle.

The gauge component 2 is likewise generally tubular in configuration and is formed from resilient metal of suitable hardness particularly at the thread gauging surface thereof. It includes an exteriorly threaded portion 6 engageable with the threaded portion 4 of the handle, a tapered portion 7 which is complementary to the tapered portion 5 of the handle and a head portion 8 in which the gauging thread 8' is formed. Additionally, the tapered and head portions are provided with diametrically opposite longitudinally extending slots, 9, 9 forming the said head into two halves 10, 10 which are moved toward each other as the gauging portion is moved inwardly by the interengagements of the two tapered surfaces, the resilience of the halves 10, 10 causing them to move away from each other as the gauging component is moved outwardly. A pair of diametrically opposite transverse holes 11, 11 formed in the portion of the tapered portion of the gauging component which extends beyond the end of the handle component 1 permits the use of a capstan bar to rotate the gauging component in the handle component.

The locking component 3 is likewise tubular in form, the outer surface thereof including an inner end portion 12 of slightly less diameter than the minor diameter of the threaded portion 4 of the handle and adapted to abut the threaded end 6 of the gauging component 2. The locking component further includes an outer end 13 which is externally threaded and which engages the threads 4 of the handle, said outer end further having transverse end slots 14, 14 which are engageable by a screwdriver. The length of said locking component is such that in all adjustments of the gauging component, the outer end of the locking component will be disposed a distance represented by several convolutions of the threads 4 within the handle component.

Since the tapered engagement between the handle engaging components is so slight, being of the order of approximately 3°, a pronounced amount of relative rotation between them will result in a very slight change in the extent to which the gauging thread portions 10, 10 will be moved toward or away from each other, wherefore, extremely fine adjustments may be readily made, the screwing of the locking component into tight engagement with the gauging component serving to prevent unintended shifting of the parts, it being noted that the locking component is completely housed within the handle component.

Since the gauge is formed of nested tubular components, it may be readily cleaned by flushing with suitable cleaning fluid and then being subjected to a blast of compressed air through it or it may be suitably cleaned by air blast alone.

Referring next to FIGS. 7 and 8, there is shown the manner in which the novel design of the gauges adapts them to be used in pairs. Gauges of this character are usually employed to accept those pieces which fall within a tolerance defined by those gauges and the gauges in any such pair are commonly designated as "go" and "no go." Since the outer ends of the locking components are disposed well within the ends of the handle components the threads at the outer ends of a pair of handle components are available to be employed as the means to engage a connector component 15 comprising a short tubular length of metal which is externally threaded at each end as at 16, 16 to engage the threads 4 of a pair of handle components which extend beyond the end of the locking components; said connector having a central peripheral rib 17 engaged by the outer ends of the handle components as shown in FIG. 7. The bore 18 of the connector serves to permit the connected gauges to be cleaned when desired in the manner above referred to. When the pair of gauges are thus connected, it is to be noted that the locking components are completely isolated against tampering.

Finally referring to FIGS. 9 and 10, there is shown a modification of the invention which is suitable for larger diameters of thread and in which gauging component 19 is divided into three equally separated jaw portions 20 by slots 21 which otherwise correspond to the slots 9, 9 in the first embodiment of the invention. The handle component 1 and locking component 3 of the first embodiment may be employed without change in this embodiment of the invention and the gauging component 19 may be rotated for adjustment in the handle component 1 by a capstan bar inserted in the holes 22, 22 which correspond to the holes 11, 11 of the first embodiment. A pair of gauges of this character can, of course, be connected into a "go" and "no go" unit by the same means as above described and since it is tubular in configuration it can be as readily cleaned as the first embodiment whether used singly or in pairs as above suggested.

Thus there has been provided a ring gauge for gauging external threads on elements which may be so located as to be difficult for access by the ordinary disk type ring gauges for external threads, which is adapted for ready cleaning, and which can be combined into pairs of gauges, it being noted that the internal threads on the handle component serve to mount the gauging component, the locking means and the connector means.

While the foregoing specification has disclosed certain presently preferred embodiments of the invention, it is not to be deemed that the invention is limited to the embodiments thus disclosed by way of example and it will be understood that the invention includes as well all such changes and modifications in the parts and in the construction, combination and arrangement of parts as shall come within the purview of the appended claims.

I claim:

1. In a thread gauge for gauging external threaded surfaces, a tubular handle component, a tubular gauging component, and a tubular locking component; said handle component comprising an elongated tubular element having an axially disposed, frusto-conical internal surface at one end thereof constituting a socket for said gauging component and an internally threaded surface disposed on the same axial line as said socket and extending from the inner, smaller end of said socket to the opposite end of said handle component; said gauging component having at one end thereof a frusto-conical external surface complementary to said socket of said handle component, an externally threaded surface engaging said internally threaded surface of said handle component adjacent to said socket, and having a gauging thread portion at the larger end of said frusto-conical portion; said frusto-conical portion having a plurality of longitudinal slots dividing said frusto-conical portion into a plurality of jaws; and said locking component comprising a tubular element externally threaded and disposed wholly internally of and threadedly engaging the threads of said handle component and having an inner end abutting the inner threaded end of said gauging component to lock said gauging component in its adjusted position in said handle component.

2. A thread gauge as claimed in claim 1 in which said jaws of said gauging component are resilient and are biased normally to spread apart a distance greater than the dimension of the thread to be gauged thereby, whereby adjustment of said gauging component in said handle component tends always to move said jaws toward each other in opposition to said bias.

3. A thread gauge as claimed in claim 1 in which said locking component is of such length that the end thereof which is remote from said gauging component is disposed inwardly of the end of said handle component a distance equal to the axial length of a plurality of the threads of said handle component.

4. A thread gauge as claimed in claim 1 in which a portion of the larger end of said frusto-conical portion of said gauging component projects beyond the end of said handle component and in which said projecting portion is provided with means engageable by a tool to effect adjusting rotation thereof in said handle component.

5. The combination of a pair of thread gauges as claimed in claim 1 disposed with the handles thereof in axial alignment and with the ends thereof remote from the gauging components thereof juxtaposed and a connecting means engaging both of said juxtaposed ends to form a single thread gauging unit having "go" and "no go" gauges.

6. A thread gauging unit as claimed in claim 5 in which said connecting means comprises a tubular element externally threaded at both ends engaging the internal threads of both handle components at said juxtaposed ends.

References Cited by the Examiner
UNITED STATES PATENTS

| | | | |
|---|---|---|---|
| 953,282 | 3/10 | Nash. | |
| 2,340,428 | 2/44 | Ramsdell | 33—199 |
| 2,595,917 | 5/52 | Bath | 33—199 X |
| 2,788,980 | 4/57 | Black | 279—7 |

ISAAC LISANN, *Primary Examiner.*